United States Patent
Zhou et al.

(10) Patent No.: US 12,279,106 B2
(45) Date of Patent: Apr. 15, 2025

(54) INTERNET OF VEHICLES COMMUNICATION METHOD, DISTRIBUTION MODULE, CENTER SERVER, AND REGIONAL SERVER

(71) Applicant: Huawei Cloud Computing Technologies Co., Ltd., Guizhou (CN)

(72) Inventors: Kai Zhou, Shenzhen (CN); Yan Liu, Shenzhen (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 605 days.

(21) Appl. No.: 17/334,087

(22) Filed: May 28, 2021

(65) Prior Publication Data

US 2021/0289415 A1     Sep. 16, 2021

Related U.S. Application Data

(63) Continuation of application No. PCT/CN2019/108467, filed on Sep. 27, 2019.

(30) Foreign Application Priority Data

Nov. 30, 2018   (CN) .......................... 201811458865.7

(51) Int. Cl.
| | |
|---|---|
| *H04W 4/46* | (2018.01) |
| *H04L 67/12* | (2022.01) |
| *H04W 4/44* | (2018.01) |
| *H04W 36/32* | (2009.01) |
| *H04L 67/52* | (2022.01) |

(52) U.S. Cl.
CPC .............. *H04W 4/46* (2018.02); *H04W 4/44* (2018.02); *H04W 36/322* (2023.05); *H04L 67/12* (2013.01); *H04L 67/52* (2022.05)

(58) Field of Classification Search
None
See application file for complete search history.

(56) References Cited

U.S. PATENT DOCUMENTS

| | | | | |
|---|---|---|---|---|
| 7,890,576 B2* | 2/2011 | Button | .................. | H04W 4/029 |
| | | | | 709/219 |
| 9,393,877 B2* | 7/2016 | Günter | .................... | B60L 53/65 |

(Continued)

FOREIGN PATENT DOCUMENTS

| | | |
|---|---|---|
| CN | 103078930 A | 5/2013 |
| CN | 103795793 A | 5/2014 |

(Continued)

*Primary Examiner* — Gregory B Sefcheck
(74) *Attorney, Agent, or Firm* — Conley Rose, P.C.

(57) ABSTRACT

An internet of vehicles communication method includes receiving reported data of a vehicle, sending the reported data to a first regional server in a first cluster, where the reported data includes information about a first location of the vehicle, receiving information about a second location of the vehicle from the first regional server, where the second location is predicted by the first regional server and is about where the vehicle is to arrive, obtaining an identifier or an address of a second distribution device based on the second location when the second location is outside a service region of the first cluster, and sending the identifier or the address of the second distribution device to the vehicle.

18 Claims, 11 Drawing Sheets

(56) References Cited

U.S. PATENT DOCUMENTS

| | | | |
|---|---|---|---|
| 9,668,103 B1* | 5/2017 | Edwards | G09B 29/003 |
| 9,979,790 B1* | 5/2018 | Park | H04W 76/10 |
| 10,037,689 B2* | 7/2018 | Taylor | G05D 1/0285 |
| 11,508,010 B2* | 11/2022 | Choi | H04W 4/021 |
| 11,741,135 B2* | 8/2023 | Messmer | H04W 64/003 |
| | | | 701/532 |
| 2010/0285827 A1* | 11/2010 | Kim | H04W 48/14 |
| | | | 455/517 |
| 2013/0089103 A1* | 4/2013 | Hersent | H04L 41/0896 |
| | | | 370/401 |
| 2013/0111015 A1 | 5/2013 | Bauchot et al. | |
| 2015/0043429 A1* | 2/2015 | Kim | H04L 67/52 |
| | | | 370/328 |
| 2015/0271632 A1* | 9/2015 | Venkatraman | H04W 24/08 |
| | | | 455/456.2 |
| 2016/0127486 A1* | 5/2016 | Chen | H04W 4/029 |
| | | | 709/206 |
| 2016/0234652 A1* | 8/2016 | Chao | H04W 4/33 |
| 2017/0134059 A1* | 5/2017 | Eskridge, Jr. | H04W 36/20 |
| 2017/0256034 A1* | 9/2017 | Bai | G06F 3/147 |
| 2017/0332213 A1 | 11/2017 | Xu et al. | |
| 2018/0189574 A1* | 7/2018 | Brueckner | H04N 19/10 |
| 2018/0324548 A1* | 11/2018 | Venkatraman | H04W 76/14 |
| 2018/0332524 A1* | 11/2018 | Rasanen | H04W 88/10 |
| 2018/0376448 A1* | 12/2018 | Wild | H04W 68/005 |
| 2019/0104458 A1* | 4/2019 | Svennebring | H04L 45/42 |
| 2019/0191265 A1* | 6/2019 | Altintas | H04L 43/0876 |
| 2020/0019445 A1* | 1/2020 | Altintas | G06F 9/5038 |
| 2020/0210691 A1* | 7/2020 | Gehrling | B60W 60/0015 |
| 2020/0260333 A1* | 8/2020 | Kousaridas | H04W 4/40 |
| 2020/0413481 A1* | 12/2020 | Shemer | G06F 9/4856 |
| 2021/0295705 A1* | 9/2021 | Yang | G01C 21/3407 |
| 2021/0334294 A1* | 10/2021 | Messmer | H04W 64/003 |

FOREIGN PATENT DOCUMENTS

| | | |
|---|---|---|
| CN | 104537839 A | 4/2015 |
| CN | 104865953 A | 8/2015 |
| CN | 105873137 A | 8/2016 |
| CN | 106303991 A | 1/2017 |
| CN | 206541448 U | 10/2017 |
| CN | 108605232 B | 5/2021 |
| WO | 2015078238 A1 | 6/2015 |
| WO | 2017171806 A1 | 10/2017 |

* cited by examiner

INTERNET OF VEHICLES COMMUNICATION METHOD, DISTRIBUTION MODULE, CENTER SERVER, AND REGIONAL SERVER

CROSS-REFERENCE TO RELATED APPLICATIONS

This application is a continuation of International Patent Application No. PCT/CN2019/108467 filed on Sep. 27, 2019, which claims priority to Chinese Patent Application No. 201811458865.7 filed on Nov. 30, 2018. The disclosures of the aforementioned applications are hereby incorporated by reference in their entireties.

TECHNICAL FIELD

This application relates to the communications field, and in particular, to an internet of vehicles communication method, a distribution module, a center server, and a regional server.

BACKGROUND

The internet of vehicles (or vehicle to everything (V2X)) refers to a communications system between vehicles, or between a vehicle and a pedestrian or a cyclist, and between a vehicle and an infrastructure. The vehicle uses various sensors (such as a laser radar and a millimeter-wave radar) or cameras installed on the vehicle, to obtain a vehicle driving status, a system running status (which may be fed back through a Controller Area Network (CAN) bus, for example, a braking state or a turn signal status), and surrounding road environment information (a roadside system may broadcast static or dynamic information, or a high-precision map may be built in the vehicle), and uses a Global Positioning System (GPS) and another positioning method (for example, a cellular network positioning technology, a visual positioning technology, or an inertial navigation technology) to obtain accurate vehicle location information through fused location. In addition, the information is transmitted in an end-to-end manner by using technologies such as a short-distance communications technology and a cellular network communications technology, to share the information in an entire internet of vehicles system. By analyzing and processing the information and reporting a road condition to and provide a driving condition warning for a driver in a timely manner, vehicle communication efficiency is effectively increased and vehicle communication security is improved.

FIG. 1 shows current understanding of an internet of vehicles architecture in the industry. Vehicles may communicate with each other through a PC5 interface. The vehicle may further communicate with a V2X server through a Uu interface, and a device such as a smart road facility (for example, a traffic light signal controller or an electronic sign), a pedestrian, and an e-bike may also be connected to the V2X server to implement V2X communication. In the internet of vehicles architecture shown in FIG. 1, only networking of a single V2X server is considered. However, in an actual V2X network deployment process, departments or institutions of different regions deploy respective V2X servers, and the vehicle travels across service regions of different internet of vehicles servers in a driving process. How to ensure continuity of V2X services in a multi-V2X server networking architecture becomes a key technical issue for large-scale commercial use of the V2X.

SUMMARY

To ensure continuity of V2X services in a multi-V2X server networking architecture, embodiments of this application provide an internet of vehicles communication method and a related apparatus, so that a vehicle can enjoy continuous internet of vehicles services when traveling across different geographical regions.

A first aspect of this application provides an internet of vehicles communication method, which includes the following.

A first distribution module receives reported data of a vehicle, and sends the reported data of the vehicle to a first regional server in a first cluster. The reported data includes information about a first location of the vehicle, and the cluster is a server cluster constituted by regional servers.

In this embodiment of this application, when the vehicle is located in a service region of the first cluster, the vehicle may communicate with the first distribution module of the first cluster. In a possible implementation, the vehicle communicates with the first distribution module by using an identifier or an address of the first distribution module. Further, when the vehicle is located in the service region of the first cluster, the vehicle sends the reported data to the first distribution module. The reported data includes the information about the first location of the vehicle. In a possible implementation, the first location is a current location of the vehicle.

In this embodiment of this application, after receiving the information about the first location, the first distribution module may determine whether a geographical location of the first location is in the service region of the first cluster. If the first location is in the service region of the first cluster, it may be determined that the first location is in a service region of the first regional server in the first cluster. In other words, the vehicle is currently located in the service region of the first regional server in the first cluster.

The first distribution module receives information that is about a second location of the vehicle and that is sent by the first regional server. The second location is a location that is predicted by the first regional server based on the first location and at which the vehicle is to arrive, and the second location is outside the service region of the first regional server.

In a possible implementation, after receiving the reported data that is of the vehicle and that is sent by the first distribution module, the first regional server may provide a service for the vehicle. The service includes track prediction. In this embodiment of this application, the first regional server may predict a predicted track of the vehicle, to provide services such as a road condition message and a collision warning. In a possible implementation, the first regional server may further determine, based on the predicted track of the vehicle, that the vehicle is to leave the service region of the first regional server. Further, the first regional server predicts the second location at which the vehicle is to arrive, and the second location is outside the service region of the first regional server.

The first distribution module determines that the second location is outside the service region of the first cluster, and the first distribution module obtains an identifier or an address of a second distribution module based on the second location. The second distribution module is configured to distribute received vehicle data to a regional server in a second cluster, and the second location is in a service region of the second cluster.

The first distribution module sends the identifier or the address of the second distribution module to the vehicle. The identifier or the address of the second distribution module is used to enable the vehicle to communicate with the second distribution module by using the identifier or the address of the second distribution module.

It should be noted that a service region of a cluster is not infinite. In a possible implementation, the service region of the cluster may be a city, or may be a district/county, or may be another administrative unit. This is not limited herein. It should be noted that, when the vehicle travels from a service region of a cluster to a service region of another cluster, the vehicle communicates with different distribution modules and the vehicle has to switch an access address. Therefore, an identifier or an address of a distribution module corresponding to a newly arrived service region needs to be obtained.

When the vehicle travels across service regions of different clusters, an access address needs to be switched. However, when the vehicle travels across service regions of different regional servers in a same cluster, an access address does not need to be switched. Therefore, a minimum unit for switching the access address is a cluster instead of a regional server. This increases a granularity of switching the access address, and reduces a frequency of switching the access address. Therefore, a complex procedure in a switching process is reduced, and performance overheads of the vehicle and the first regional server are reduced.

In a possible implementation, the first location is in the service region of the first regional server. The first distribution module determines the first regional server based on the first location, and sends the reported data of the vehicle to the first regional server, so that the first regional server can provide the service for the vehicle.

In a possible implementation, the first location is further in a service region of the second regional server, and the second regional server is a regional server in the first cluster. The first distribution module further determines the second regional server based on the information about the first location, and sends the received reported data of the vehicle to the second regional server. Therefore, the first regional server may predict the track of the vehicle, so that service continuity can be ensured when the vehicle leaves the first regional server.

In a possible implementation, that the first distribution module obtains an identifier or an address of a second distribution module based on the second location includes the following.

The first distribution module sends a message for obtaining access information of an internet of vehicles server to a first center server. The message includes the information about the second location, and the first center server is configured to control at least two server clusters including the first cluster and the second cluster. In this way, a solution for ensuring service continuity of the vehicle when the vehicle travels across service regions of different clusters is provided.

The first distribution module receives the identifier or the address that is of the second distribution module and that is sent by the first center server.

In a possible implementation, that the first distribution module obtains an identifier or an address of a second distribution module based on the second location includes the following.

The first distribution module sends a message for obtaining access information of an internet of vehicles server to a first center server. The message includes the information about the second location. The first center server is configured to control the first cluster, and is further configured to communicate with a second center server that controls the second cluster. The first distribution module receives the identifier or the address that is of the second distribution module and that is sent by the first center server. The identifier or the address of the second distribution module is obtained by the first center server from the second center server based on the second location. In this way, a solution for ensuring service continuity of the vehicle when the vehicle travels across service regions of different center servers is provided.

In a possible implementation, after the first distribution module receives the identifier or the address that is of the second center server and that is sent by the first center server, the method further includes the following.

The first distribution module sends a notification message to a home center server of the vehicle. The home center server is a subscribed center server, and the notification message is used to notify the home center server that the vehicle prepares to travel from a service region of the first center server to a service region of the second center server, so that the home center server stores information about the current location of the vehicle.

In a possible implementation, the method further includes the following.

The first distribution module receives location prediction information sent by the first regional server. The location prediction information indicates that the vehicle is about to go to a third location, and the third location is outside the service region of the first regional server. The first distribution module determines that the third location is in the second regional server, and the first distribution module sends the received reported data of the vehicle to the second regional server. The second regional server is a regional server in the first cluster, and the third location is in the service region of the second regional server.

When the vehicle travels across service regions of different clusters, an access address needs to be switched. However, when the vehicle travels across service regions of different regional servers in a same cluster, an access address does not need to be switched. Therefore, a minimum unit for switching the access address is a cluster instead of a regional server. This increases a granularity of switching the access address, and reduces a frequency of switching the access address. Therefore, a complex procedure in a switching process is reduced, and performance overheads of the vehicle and the first regional server are reduced.

In a possible implementation, the vehicle communicates with the first distribution module by using the identifier or the address of the first distribution module.

A second aspect of this application provides an internet of vehicles communication method, including the following.

A first center server obtains a message that is sent by a first distribution module and that is for obtaining access information of an internet of vehicles server. The message includes information about a second location, the first distribution module is configured to distribute received vehicle data to a regional server in a first cluster, the cluster is a server cluster constituted by regional servers, and the first cluster is a cluster controlled by the first center server. The first center server obtains an identifier or an address of a second distribution module based on the second location. The first center server sends the identifier or the address of the second distribution module to the first distribution module. The second distribution module is configured to distribute received vehicle data to a regional server in a second cluster, and the second location is in a service region of the second cluster.

When the vehicle travels across service regions of different clusters, an access address needs to be switched. However, when the vehicle travels across service regions of different regional servers in a same cluster, an access address does not need to be switched. Therefore, a minimum unit for switching the access address is a cluster instead of a regional server. This increases a granularity of switching the access address, and reduces a frequency of switching the access address. Therefore, a complex procedure in a switching process is reduced, and performance overheads of the vehicle and the regional server are reduced.

In a possible implementation, the second location is in a service region of the first center server, and before the first center server obtains the identifier or the address of the second distribution module based on the second location, the method further includes the following.

The first center server determines the second cluster based on the second location, where the second cluster is a cluster controlled by the first center server.

In a possible implementation, the second location is outside the service region of the first center server, and that the first center server obtains an identifier or an address of a second distribution module based on the second location includes the following.

The first center server sends a message of the second location to the second center server.

The first center server receives the identifier or the address that is of the second distribution module and that is sent by the second center server.

A third aspect of this application provides an internet of vehicles communication method, including the following.

A first regional server receives reported data that is of a vehicle and that is sent by a first distribution module. The reported data includes information about a first location of the vehicle, the first distribution module is configured to distribute the received vehicle data to a first regional server in a first cluster, the cluster is a server cluster constituted by regional servers, and the first cluster includes the first regional server.

The first regional server predicts, based on the first location, a second location at which the vehicle is to arrive, where the second location is outside a service region of the first regional server.

The first regional server sends location prediction information to the first distribution module, where the location prediction information is used to indicate that the vehicle is about to go to the second location.

When the vehicle travels across service regions of different clusters, an access address needs to be switched. However, when the vehicle travels across service regions of different regional servers in a same cluster, an access address does not need to be switched. Therefore, a minimum unit for switching the access address is a cluster instead of a regional server. This increases a granularity of switching the access address, and reduces a frequency of switching the access address. Therefore, a complex procedure in a switching process is reduced, and performance overheads of the vehicle and the first regional server are reduced.

A fourth aspect of this application provides a distribution module, including at least one processor and a communications interface.

The communications interface is configured to distribute received vehicle data to a regional server in a cluster, where the cluster is a server cluster constituted by regional servers.

The at least one processor is configured to determine a location of the vehicle based on the received vehicle data, and determine whether the location of the vehicle is located in a service region of the cluster.

The communications interface is further configured to perform the method according to the first aspect.

When the vehicle travels across service regions of different clusters, an access address needs to be switched. However, when the vehicle travels across service regions of different regional servers in a same cluster, an access address does not need to be switched. Therefore, a minimum unit for switching the access address is a cluster instead of a regional server. This increases a granularity of switching the access address, and reduces a frequency of switching the access address. Therefore, a complex procedure in a switching process is reduced, and performance overheads of the vehicle and the regional server are reduced.

A fifth aspect of this application provides a center server, including at least one processor and a communications interface.

The communications interface is configured to send an instruction to a distribution module to control a cluster. The cluster is a server cluster constituted by regional servers, and the distribution module is configured to distribute received vehicle data to a regional server in the cluster.

The at least one processor is configured to determine, based on a received location of the vehicle, whether the vehicle is located in a service region of the center server.

The communications interface is further configured to perform the communication method according to the second aspect or the third aspect.

The at least one processor is further configured to perform the internet of vehicles processing method according to the second aspect.

When the vehicle travels across service regions of different clusters, an access address needs to be switched. However, when the vehicle travels across service regions of different regional servers in a same cluster, an access address does not need to be switched. Therefore, a minimum unit for switching the access address is a cluster instead of a regional server. This increases a granularity of switching the access address, and reduces a frequency of switching the access address. Therefore, a complex procedure in a switching process is reduced, and performance overheads of the vehicle and the regional server are reduced.

A sixth aspect of this application provides a regional server, including at least one processor and a communications interface.

The communications interface is configured to receive reported data that is of a vehicle and that is sent by a first distribution module. The reported data includes information about a first location of the vehicle, the first distribution module is configured to distribute the received vehicle data to a regional server in a first cluster, the cluster is a server cluster constituted by regional servers, and the first cluster includes the first regional server.

The at least one processor is configured to predict, based on the first location, a second location at which the vehicle is to arrive, where the second location is outside a service region of the first regional server.

The communications interface is configured to send location prediction information to the first distribution module, where the location prediction information is used to indicate that the vehicle is about to go to the second location.

When the vehicle travels across service regions of different clusters, an access address needs to be switched. However, when the vehicle travels across service regions of different regional servers in a same cluster, an access address does not need to be switched. Therefore, a minimum unit for switching the access address is a cluster instead of a regional server. This increases a granularity of switching the access address, and reduces a frequency of switching the access address. Therefore, a complex procedure in a switching process is reduced, and performance overheads of the vehicle and the first regional server are reduced.

A seventh aspect of this application provides an internet of vehicles system, including at least one cluster, where the cluster is a server cluster constituted by regional servers.

A distribution module of the cluster is configured to perform the method according to the first aspect, and the distribution module is configured to distribute received vehicle data to a regional server in the cluster.

In a possible implementation, the internet of vehicles system further includes at least one center server, configured to perform the method according to the second aspect.

In a possible implementation, the regional server in the cluster is further configured to perform the method according to the third aspect.

When the vehicle travels across service regions of different clusters, an access address needs to be switched. However, when the vehicle travels across service regions of different regional servers in a same cluster, an access address does not need to be switched. Therefore, a minimum unit for switching the access address is a cluster instead of a regional server. This increases a granularity of switching the access address, and reduces a frequency of switching the access address. Therefore, a complex procedure in a switching process is reduced, and performance overheads of the vehicle and the regional server are reduced.

Still another aspect of this application provides a computer-readable storage medium. The computer-readable storage medium stores an instruction. When the instruction is run on a computer, the computer is enabled to perform the methods according to the foregoing aspects.

According to the foregoing technical solutions, it can be learned that the embodiments of this application have the following advantages When the vehicle travels across service regions of different clusters, an access address needs to be switched. However, when the vehicle travels across service regions of different regional servers in a same cluster, an access address does not need to be switched. Therefore, a minimum unit for switching the access address is a cluster instead of a regional server. This increases a granularity of switching the access address, and reduces a frequency of switching the access address. Therefore, a complex procedure in a switching process is reduced, and performance overheads of the vehicle and the first regional server are reduced.

DESCRIPTION OF EMBODIMENTS

The following describes embodiments of this application with reference to accompanying drawings.

The terms used in the embodiments of this application are merely for the purpose of illustrating specific embodiments, and are not intended to limit this application. The terms "a", "said" and "the" of singular forms used in the embodiments and the appended claims of this application are also intended to include plural forms, unless otherwise specified in the context clearly. It should also be understood that, the term "and/or" used in this specification indicates and includes any or all possible combinations of one or more associated listed items. In addition, the character "/" in this specification generally indicates an "or" relationship between the associated objects.

It should be understood that although terms "first", "second", "third", and the like may be used in the embodiments of this application to describe various messages, requests, and terminals, the messages, requests, and terminals are not limited by the terms. These terms are used only to distinguish between the messages, the requests, and the terminals. For example, without departing from the scope of the embodiments of this application, a first terminal may also be referred to as a second terminal, and similarly, a second terminal may also be referred to as a first terminal.

Depending on the context, for example, words "if" used herein may be explained as "while" or "when" or "in response to determining" or "in response to detection". Similarly, depending on the context, phrases "if determining" or "if detecting (a stated condition or event)" may be explained as "when determining" or "in response to determining" or "when detecting (the stated condition or event)" or "in response to detecting (the stated condition or event)".

Figure 1:
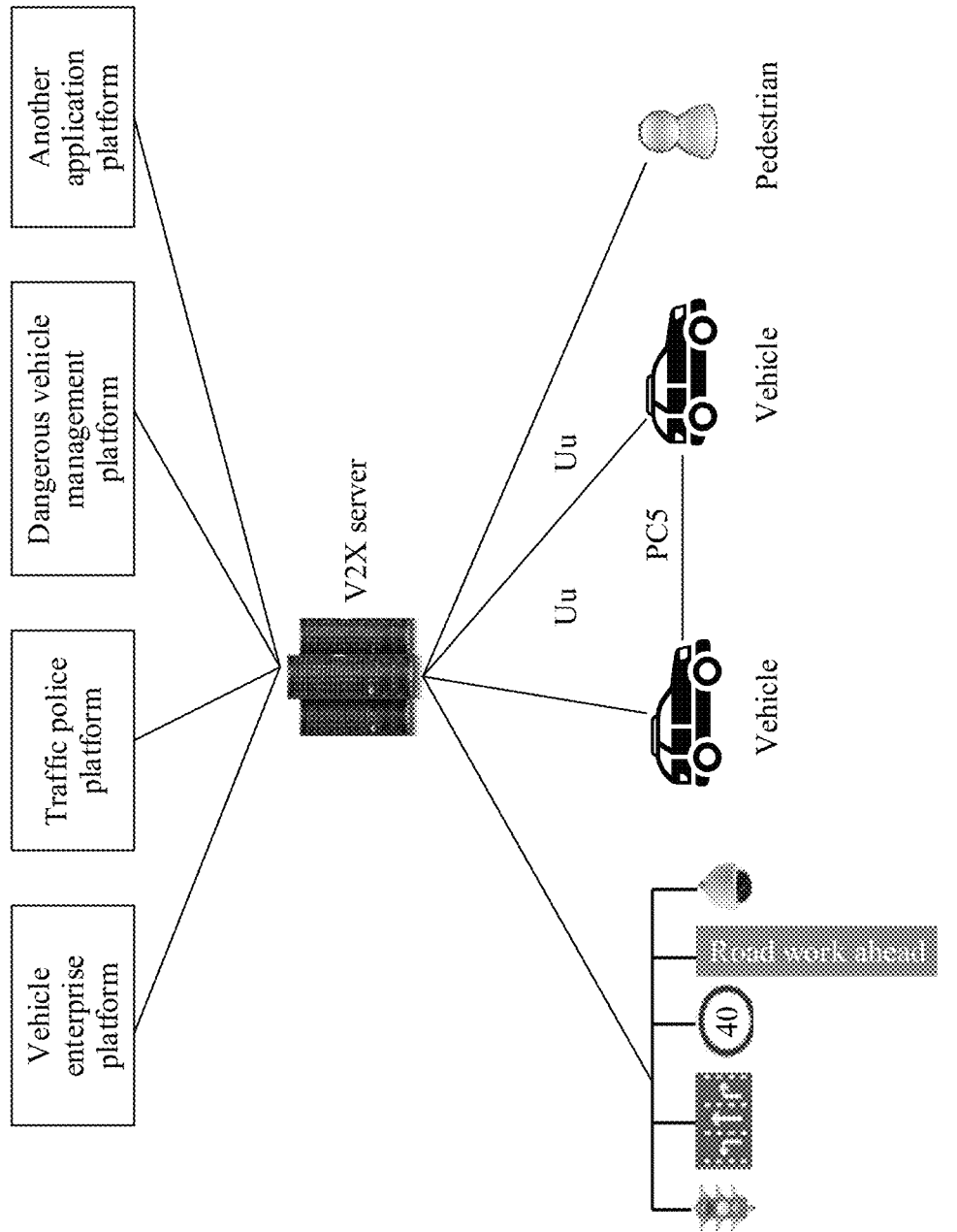
FIG. 1 is a schematic diagram of an internet of vehicles system architecture.
Figure 2A:
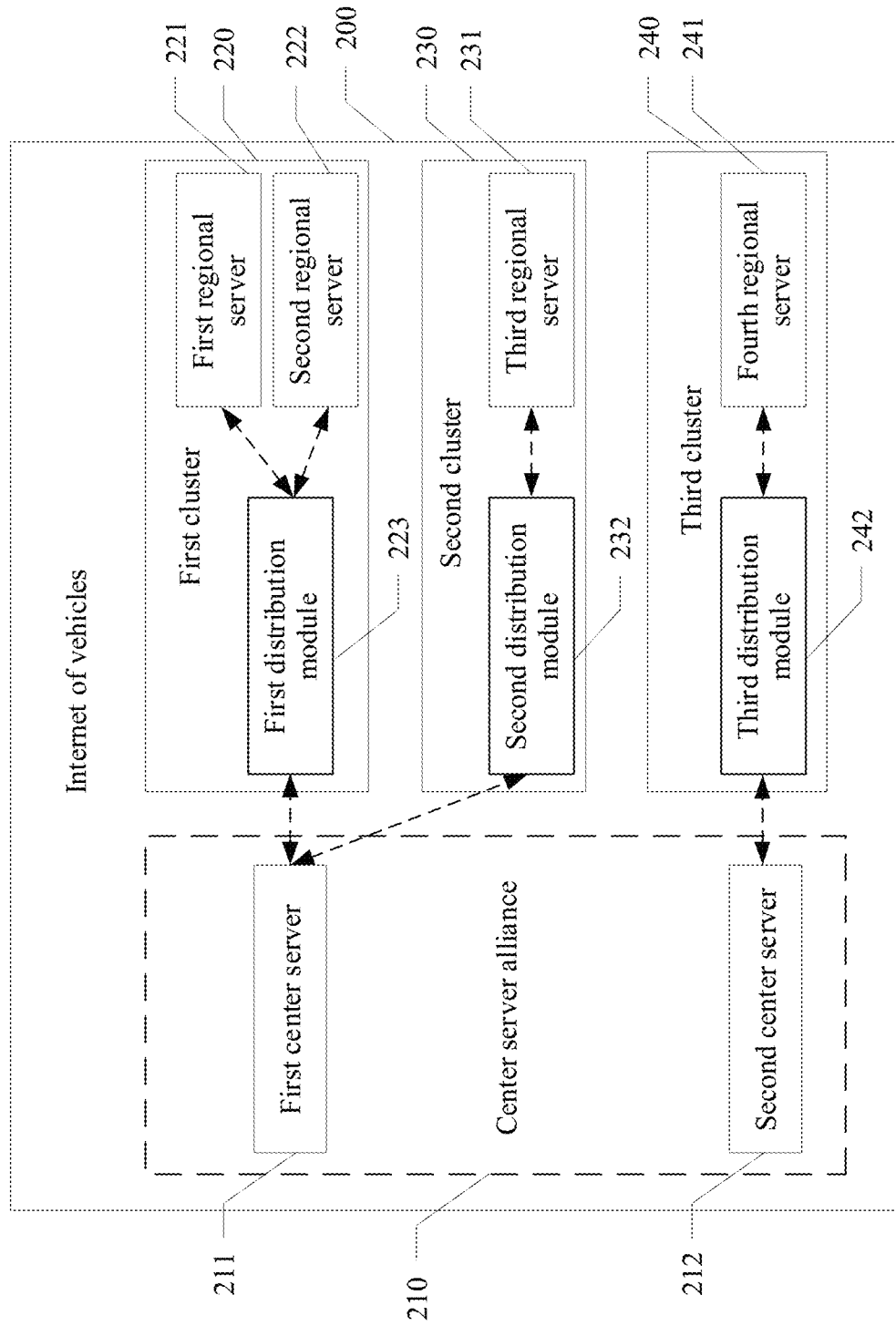
FIG. 2A is a schematic diagram of an internet of vehicles system architecture according to an embodiment of this application.

The solutions in the embodiments of this application are based on an architecture of an internet of vehicles 200 shown in FIG. 2A. The internet of vehicles 200 includes at least one center server (V2X-center (V2X-C)). A plurality of V2X-Cs constitutes a V2X-C alliance, and information may be exchanged between different V2X-Cs.

As shown in FIG. 2A, the V2X-C alliance 210 includes two V2X-Cs: a first center server 211 and a second center server 212. Each V2X-C manages at least one regional server (V2X-R). A driven vehicle may exchange information with a V2X-R in a service region in which the vehicle is located, so that the V2X-R provides a service for the vehicle.

As shown in FIG. 2A, the first center server 211 manages three V2X-Rs: a first regional server 221, a second regional server 222, and a third regional server 231. The second center server 212 manages one V2X-R: a fourth regional server 241.

It should be noted that V2X-Cs constructed by a plurality of regions, organizations, or institutions may constitute a V2X-C alliance according to planning or self-organization, and different V2X-Cs in the V2X-C alliance exchange information of service regions for which the V2X-Cs are respectively responsible. When the vehicle requires an internet of vehicles service, the vehicle is first connected to a V2X-C to which the vehicle belongs (or licensed). Then, the V2X-C determines whether the vehicle is in a service region of the V2X-C based on a current location of the vehicle. If the vehicle is in the service region of the V2X-C, the V2X-C allocates a V2X-R to the vehicle based on the current location of the vehicle. The current location of the vehicle is in a service region of the allocated V2X-R, and an access address of the V2X-R is sent to the vehicle. If the vehicle is not in the service region of the V2X-C, another V2X-C is requested to allocate a V2X-R based on the current location of the vehicle, and access information (for example, an identifier or an address) of the allocated V2X-R is transferred to the vehicle, so that the vehicle can access a V2X-R in a service region in which the current location is. In this way, the V2X-R can provide the internet of vehicles service for the vehicle.

Different V2X-Rs have different access information. Therefore, when the vehicle is driven from a service region of one V2X-R to a service region of another V2X-R, the vehicle needs to obtain access information of a V2X-R of a newly arrived region, to access the V2X-R of the newly arrived region. To access the new V2X-R, the vehicle and the V2X-R need to perform complex data and signaling exchange. Because the vehicle frequently travels across different regions in a driving process, the vehicle needs to continuously switch a V2X-R to be accessed. This causes performance overheads of the vehicle.

Therefore, an embodiment of this application provides a cluster-based internet of vehicles communication method.

In the internet of vehicles, a cluster technology is used to combine V2X-Rs managed by a same V2X-C into one or more server clusters, where a cluster includes at least one V2X-R. It should be noted that the cluster is a group of mutually independent computers that are interconnected by using a high-speed network, and may be managed in a system mode, so that when a user terminal interacts with the cluster, the cluster is like an independent server. A scenario shown in FIG. 2A is used as an example. A first cluster 220 includes the first regional server 221 and the second regional server 222, a second cluster 230 includes only the third regional server 231, and a third cluster 240 includes only the fourth regional server 241.

In this embodiment of this application, at least one distribution module is configured or deployed in each cluster. Used as a communications entrance of the cluster, the distribution module is mainly configured to receive a message of an apparatus or a device outside the cluster, and forward the message to a V2X-R in the cluster. When the V2X-R in the cluster needs to send a message to the apparatus or the device outside the cluster, the V2X-R may send the message to the apparatus or the device outside the cluster by using the distribution module. A distribution module of a cluster may jointly undertake a function of the distribution module by using one or more V2X-Rs in the cluster or by using one or more servers other than a V2X-R. This is not limited herein. The scenario shown in FIG. 2A is used as an example. A first distribution module 223 is configured or deployed in the first cluster 220, a second distribution module 232 is configured or deployed in the second cluster 230, and a third distribution module 242 is configured or deployed in the third cluster 240.

Figure 2B:
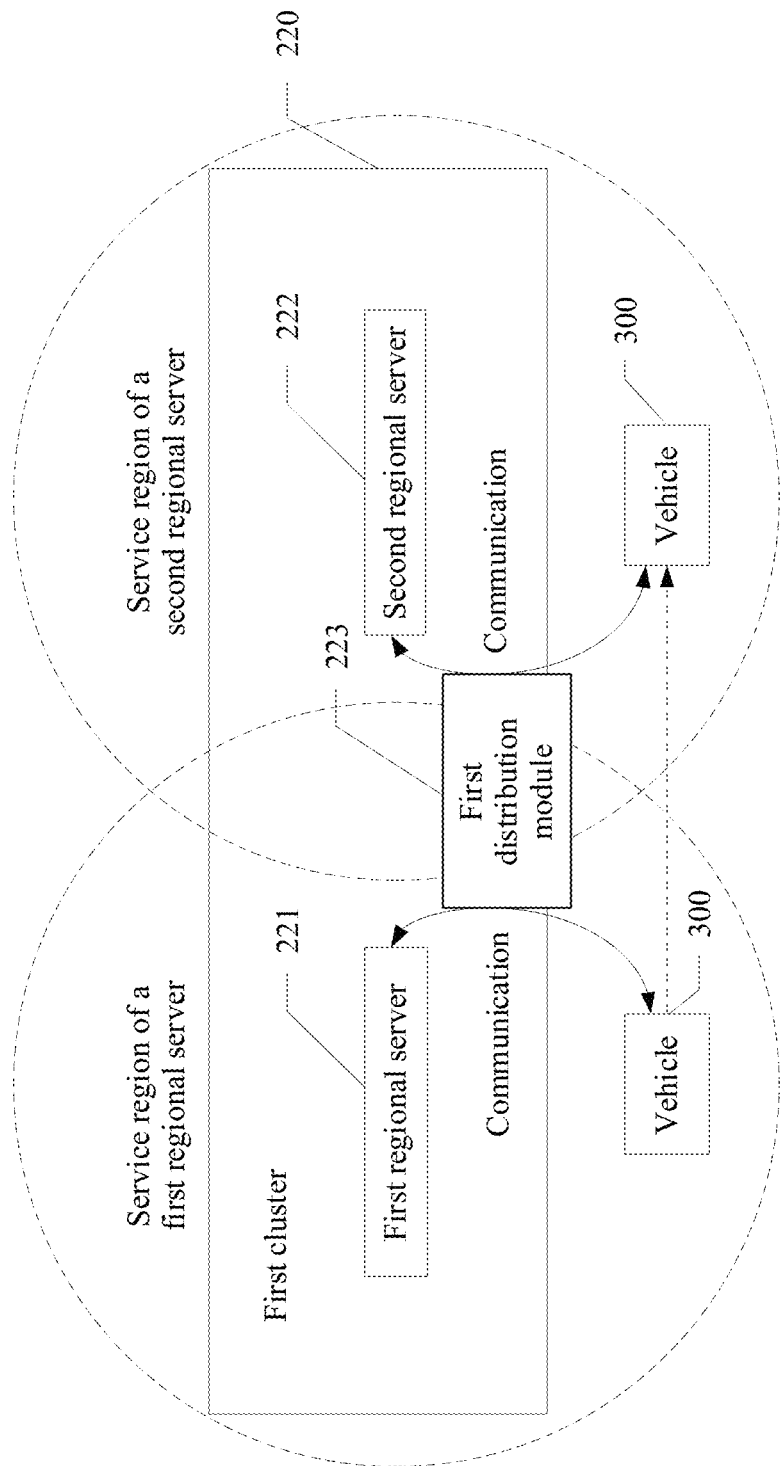
FIG. 2B is a schematic diagram of a communication process in which a vehicle is driven in service regions of different V2X-areas (V2X-Rs) of a same cluster according to an embodiment of this application.

Further, referring to FIG. 2B (which is a schematic diagram of a communication process in which a vehicle is driven in service regions of different V2X-Rs of a same cluster), the first cluster 220 includes the first regional server 221 and the second regional server 222, and the first distribution module 223 is configured or deployed in the first cluster 220. The vehicle 300 is originally located in a service region of the first regional server 221, and communicates with the first distribution module 223. Further, the vehicle 300 sends reported data to the first distribution module 223. The first distribution module 223 may determine, based on the reported data sent by the vehicle 300, that the vehicle 300 is located in the service region of the first regional server 221, and send the reported data of the vehicle 300 to the first regional server 221, so that the first regional server 221 provides a service for the vehicle 300. When the vehicle 300 continues to be driven, and is driven to a service region of the second regional server 222, the vehicle 300 sends reported data of the vehicle 300 to the first distribution module 223. In this case, the first distribution module 223 determines, based on the reported data sent by the vehicle 300, that the vehicle 300 is located in the service region of the second regional server 222, and sends the reported data of the vehicle 300 to the second regional server 222, so that the second regional server 222 provides a service for the vehicle. Therefore, in a driving process, when the vehicle 300 travels across service regions of different V2X-Rs of the first cluster, the vehicle 300 may always communicate with the first distribution module 223 of the first cluster, and a communication address on a communication destination side does not need to be switched.

In a possible implementation, a service region of one V2X-R may be a district of a city, for example, the Longhua district, Shenzhen. All V2X-Rs in one city constitute a cluster. For example, V2X-Rs in all districts in Shenzhen constitute a cluster, and one V2X-C manages clusters in at least one city. Division into regions served by the V2X-Rs and the V2X-C is determined based on a service scenario and an actual deployment status. This is not limited in this application. If a service region of a cluster is Shenzhen and each district of Shenzhen is a service region of each V2X-R in the cluster, when the vehicle is driven from the Longhua district, Shenzhen to the Futian district, although a V2X-R serving the vehicle has been changed from a V2X-R in the Longhua district to a V2X-R in the Futian district, the vehicle does not need to switch or update an address of the V2X-R communicating with the vehicle, but always communicates with a distribution module of the cluster.

It should be noted that in a possible implementation, a distribution module of a cluster has one identifier or one address, and the vehicle communicates with the distribution module by using the identifier or the address. In a possible implementation, the identifier of the distribution module may be a Uniform Resource Identifier (URI), and the address of the distribution module may be an Internet Protocol (IP) address (IP), an access address, a media access control (MAC) address, or addressing information of another type. This is not limited herein.

In this embodiment of this application, all V2X-Rs in a cluster communicate with the vehicle by using a distribution module. In other words, the distribution module is used as a unified external communications interface of the cluster. Therefore, when the vehicle travels across service regions of different V2X-Rs in a same cluster, the vehicle does not need to sense switching of a V2X-R serving the vehicle. The vehicle communicates with the distribution module, and the distribution module selects, based on a current location of the vehicle, a V2X-R whose service region covers the current location of the vehicle as the V2X-R serving the vehicle, and sends data reported by the vehicle to the V2X-R. It can be learned that in this embodiment of this application, in the driving process of the vehicle, a minimum unit that needs to switch a server access address is a cluster instead of a V2X-R. This increases a granularity of switching the access address, and reduces a frequency of switching the access address. Therefore, a complex procedure in a switching process is reduced, and performance overheads of the vehicle are reduced.

In a possible implementation, the vehicle may travel across service regions of different V2X-Rs in a service region covered by a same cluster, or may travel across service regions of different clusters in a service region covered by a same V2X-C, or may travel across service regions covered by different V2X-Cs. The following separately describes the three cases.

Figure 3:
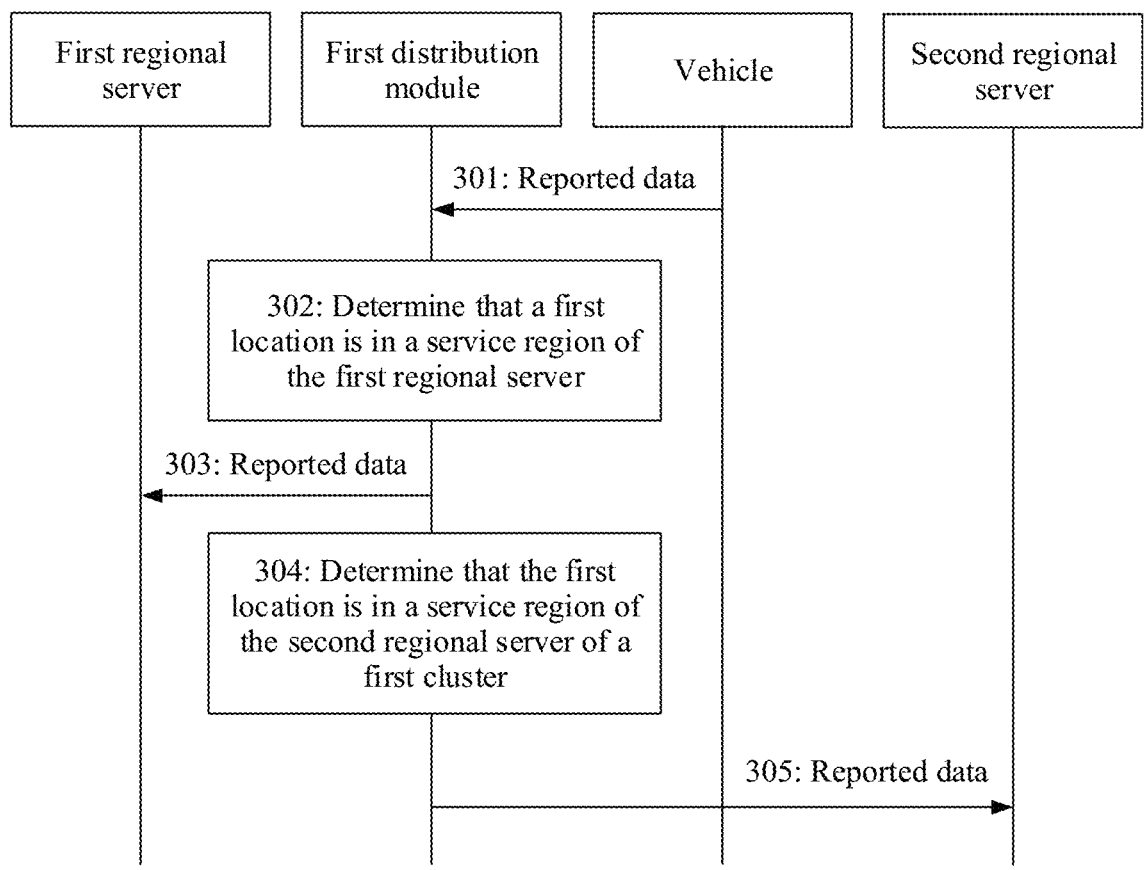
FIG. 3 is a schematic diagram of an internet of vehicles communication method when a vehicle is driven in service regions of a same cluster according to an embodiment of this application.

1. Refer to FIG. 3 for an embodiment in which a vehicle travels across service regions of different V2X-Rs in a service region covered by a same cluster.

301: The vehicle sends reported data to a first distribution module, where the reported data includes information about a first location of the vehicle.

In this embodiment of this application, when the vehicle is located in a service region of a first cluster, the vehicle may communicate with the first distribution module of the first cluster. In a possible implementation, the reported data is data reported by the vehicle to a server, and may include running data of the vehicle, status information of the vehicle, and the like. Content of the reported data and a frequency of sending the reported data are not limited in this application.

In a possible implementation, when the vehicle is located in the service region of the first cluster, the vehicle may communicate with the first distribution module by using an identifier or an address of the first distribution module. Further, the vehicle may send the reported data to the address of the first distribution module, and the reported data includes the information about the first location of the vehicle. In this application, the first location is a geographical location of the vehicle when the vehicle sends the reported data to the first distribution module, or a geographical location that is of the vehicle and that is obtained for the last time before the vehicle sends the reported data to the first distribution module, or a geographical location that is of the vehicle at a moment or in a time period and that is reported by the vehicle according to a preset rule.

It should be noted that the vehicle may obtain the first location of the vehicle by using a GPS, or may obtain the first location of the vehicle by interacting with a base station, or may obtain the first location of the vehicle in another positioning manner. This is not limited herein.

In a possible implementation, the vehicle may periodically send the data to the first distribution module, and the first distribution module may periodically send the reported data to a first regional server, for example, once every 10 seconds, once every one second, or once every 10 minutes. This is not limited herein. In a possible implementation, the frequency at which the vehicle sends the reported data is 10 hertz (Hz) recommended by the 3rd Generation Partnership Project (3GPP), namely, 10 times per second.

In a possible implementation, the vehicle may send the reported data to the first distribution module when a built-in internet of vehicles terminal is powered on, or may send the reported data to the first distribution module when the vehicle is started, or may send the reported data to the first distribution module when the vehicle starts to be driven. This is not limited herein. In a possible implementation, the vehicle may send the reported data only when the vehicle is in a driving state, and does not send the reported data when the vehicle is in a non-driving state, to increase spectrum resource utilization. This is not limited herein.

302: The first distribution module determines that the first location is in a service region of the first regional server in the first cluster.

In this embodiment of this application, after receiving the reported data, the first distribution module may obtain the information about the first location from the reported data, and determine that a geographical location of the first location is in the service region of the first regional server in the first cluster.

In a possible implementation, the first distribution module may preset information about a service region of each V2X-R in the first cluster, so that when the first distribution module receives the information about the first location, the preset service region of each V2X-R managed by the first cluster may be matched based on the first location, to determine a service region corresponding to the first location, so as to determine the first regional server. In a possible implementation, a first center server may alternatively preset information about a service region of each regional server in the first cluster, so that when the first distribution module receives the information about the first location, the first distribution module sends the information about the first location to the first center server, and then receives information about the first regional server returned by the first center server. In a possible implementation, there may be another manner of determining the service region of the first regional server based on the first location. This is not limited herein.

303: The first distribution module sends the reported data to the first regional server.

In this embodiment of this application, after the first distribution module determines that the first location is in the service region of the first regional server in the first cluster, the first distribution module may send the reported data of the vehicle to the first regional server, so that the first regional server provides services for the vehicle.

It should be noted that the services may include a road condition message, a collision warning, and various other internet of vehicles services. Further, the road condition message may be information such as whether there is a traffic jam at a current location of the vehicle, whether there is a debris flow, and whether road repair is performed. In a possible implementation, the regional server may further predict a driving track of the vehicle based on received location information of the vehicle in a period of time, and then determine a road condition message of a road section corresponding to the predicted track. This is not limited herein. Further, the collision warning may be, for example, whether there is another vehicle at a turning point, whether there is road repair, a bicycle, or a marathon at some locations, or whether a predicted track of another vehicle may intersect the predicted track of the vehicle at a same time, in other words, whether there is information indicating that there is a risk of collision between the other vehicle and the vehicle. This is not limited herein. The road condition message and the collision warning may further include other content. This is not limited herein. In this embodiment of this application, the service may further include other content. This is not limited herein.

For example, because each V2X-R in the first cluster serves each district in Shenzhen, each V2X-R has a responsible service region, for example, the Longhua district, the Nanshan district, or the Futian district. The first distribution module of the first cluster is configured to receive reported data sent by a vehicle driven in Shenzhen, and distribute the reported data to the V2X-R in the first cluster, or receive a message sent by the V2X-R in the first cluster, and deliver the message to a vehicle driven in Shenzhen.

304: Optionally, the first distribution module determines that the first location is in a service region of a second regional server in the first cluster.

In actual deployment, regions served by two adjacent V2X-Rs may overlap, and this overlapping region is referred to as an overlapping service region herein. In this embodiment, it is assumed that the first location is in an overlapping service region of the first regional server and the second regional server. In other words, the first location is in both the service region of the first regional server and the service region of the second regional server. In a possible implementation, information about the overlapping service region may be preset in the first distribution module. When the information about the first location is obtained, it may be determined whether the vehicle is currently located in the overlapping service region.

305: The first distribution module sends the reported data to the second regional server.

When the first location reported by the vehicle is located in the overlapping service region, the distribution module not only sends the reported data of the vehicle to the first regional server, but also sends the reported data of the vehicle to the second regional server, so that when the vehicle is driven away from the service region of the first regional server and is driven into the service region of the second regional server, the second region server can quickly provide a service for the vehicle. Optionally, the first distribution module may obtain service information of the vehicle from the first regional server, and then send the service information to the second regional server, so that the second regional server can continue to provide a service for the vehicle, to ensure service continuity of the vehicle.

Figure 4:
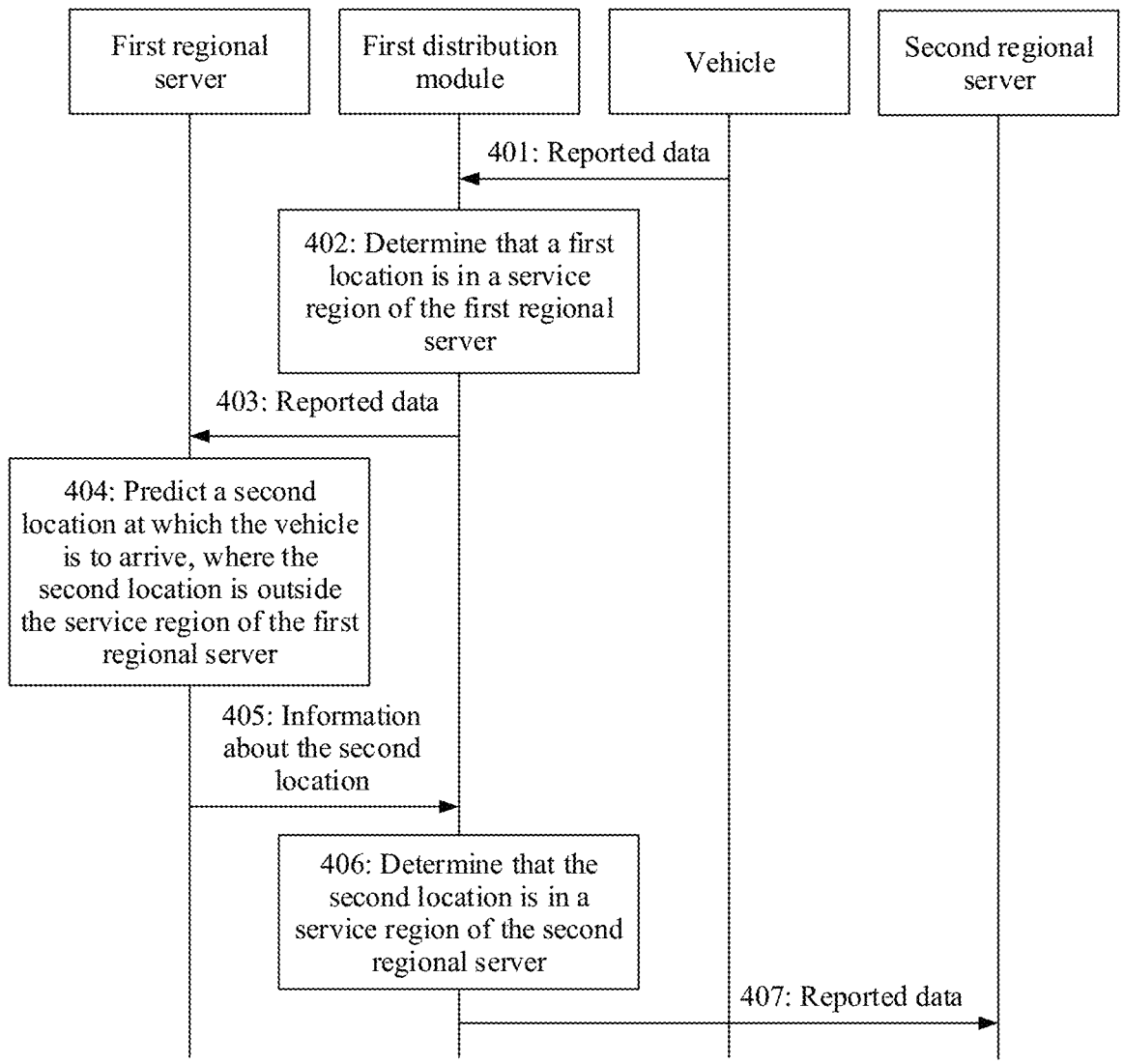
FIG. 4 is a schematic diagram of another internet of vehicles communication method when a vehicle is driven in service regions of a same cluster according to an embodiment of this application.

2. Refer to FIG. 4 for another embodiment in which a vehicle travels across service regions of different clusters in a service region covered by a same V2X-C.

401: The vehicle sends reported data to a first distribution module, where the reported data includes information about a first location of the vehicle.

402: The first distribution module determines that the first location is in a service region of a first regional server in a first cluster.

403: The first distribution module sends the reported data to the first regional server.

Steps 401 to 403 are the same as steps 301 to 303, and details are not described herein again.

404: The first regional server predicts a second location at which the vehicle is to arrive, where the second location is outside the service region of the first regional server.

405: The first regional server sends information about the second location of the vehicle to the first distribution module.

In a possible implementation, the first regional server may predict a driving route of the vehicle, to provide services such as a road condition message and a collision warning. For example, after receiving the reported data of the vehicle, the first regional server may obtain driving data of the vehicle. In a possible implementation, the driving data of the vehicle may include driving information of the vehicle at a plurality of locations at different time points, and a driving speed and a driving track of the vehicle may be obtained based on the driving data of the vehicle. Then, the first regional server may predict the driving route of the vehicle based on the driving speed and the driving track of the vehicle. In this embodiment of this application, a geographical location that is of the vehicle at a future moment or in a future time period and that is predicted by the first regional server is referred to as the second location. The second location may include one or more location points, or may include a predicted driving route including a plurality of location points, or may include a time point at which the vehicle arrives at each location point and an instantaneous speed at which the vehicle is driven to each location point. A specific format and included content of the second location are not limited in this application. When the first regional server determines, based on the driving route of the vehicle, that the vehicle is to leave the service region of the first regional server, the first server sends the information about the second location of the vehicle to the first distribution module.

406: The first distribution module determines that the second location is in a service region of a second regional server of the first cluster.

A location at which the vehicle is about to arrive and that is predicted by the first regional server is still in a service region of the first cluster. Therefore, the first distribution module still performs the method in steps 401 to 403, receives a reported message of the vehicle, and selects, based on location information in the reported message, a regional server corresponding to the location information to distribute the message.

407: The first distribution module sends reported data of the vehicle to the second regional server.

To enable the second regional server to quickly provide service for the vehicle after the vehicle is driven to the service region of the second regional server, the first distribution module may send the data reported by the vehicle to the second regional server in advance. Therefore, after the first distribution module receives, in step 406, prediction that the vehicle is to be driven to the second regional server, the first distribution module may further send the reported data of the vehicle to the second regional server.

It can be learned from method procedures in FIG. 3 and FIG. 4 that, when the vehicle is driven in the service region of the first cluster, even if the V2X-R serving the vehicle in the first cluster changes, an access point or a communication address used by the first cluster to communicate with the vehicle does not change. The access point or the communication address is the first distribution module, and the first cluster always communicates with the vehicle by using the first distribution module, to reduce a frequency of switching the access address. Therefore, a complex procedure in a switching process is reduced, and performance overheads of the vehicle are reduced.

Figure 5A:
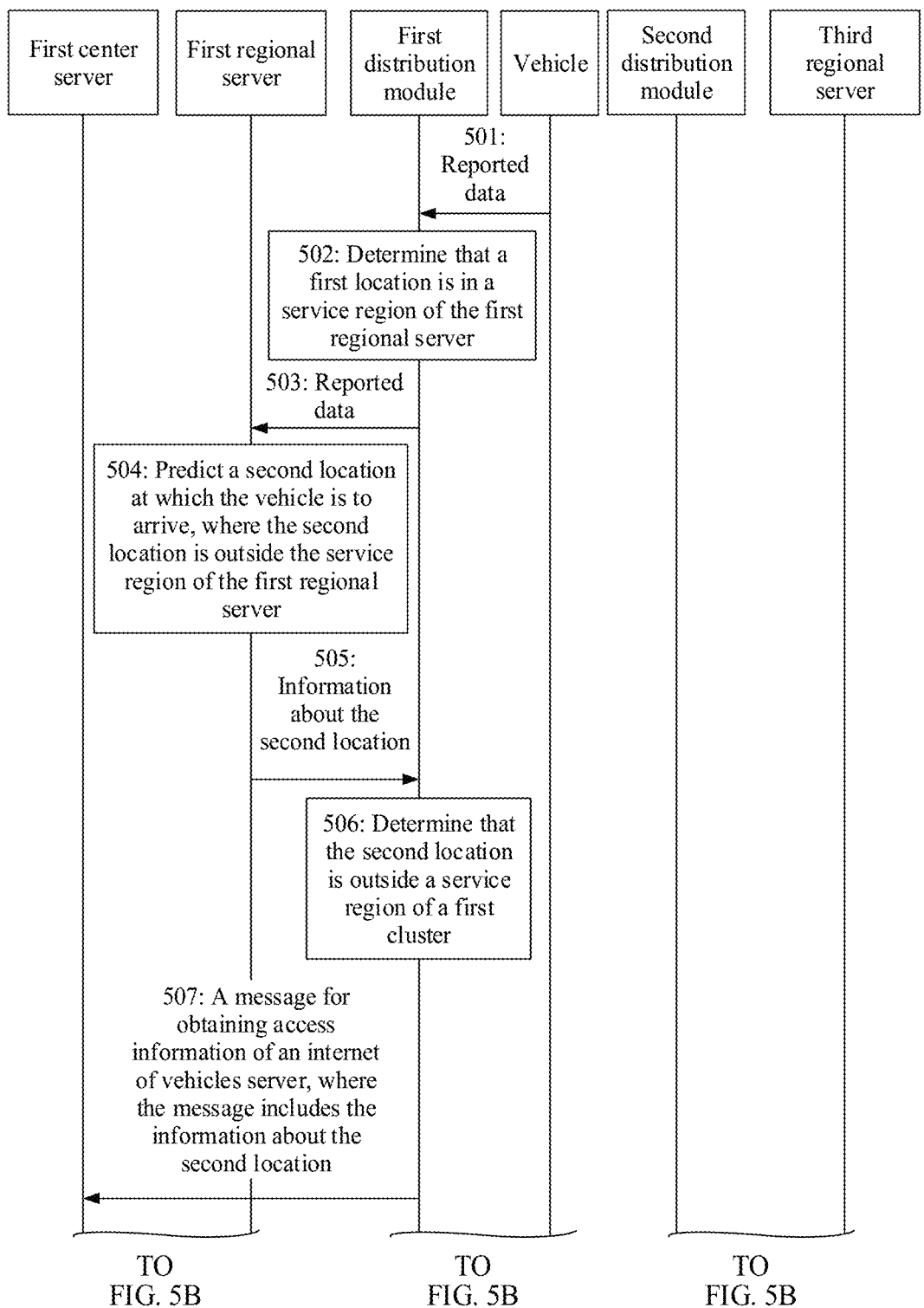
FIG. 5A and FIG. 5B are a schematic diagram of an internet of vehicles communication method when a vehicle travels across service regions of different clusters of a same center server according to an embodiment of this application.
Figure 5B:
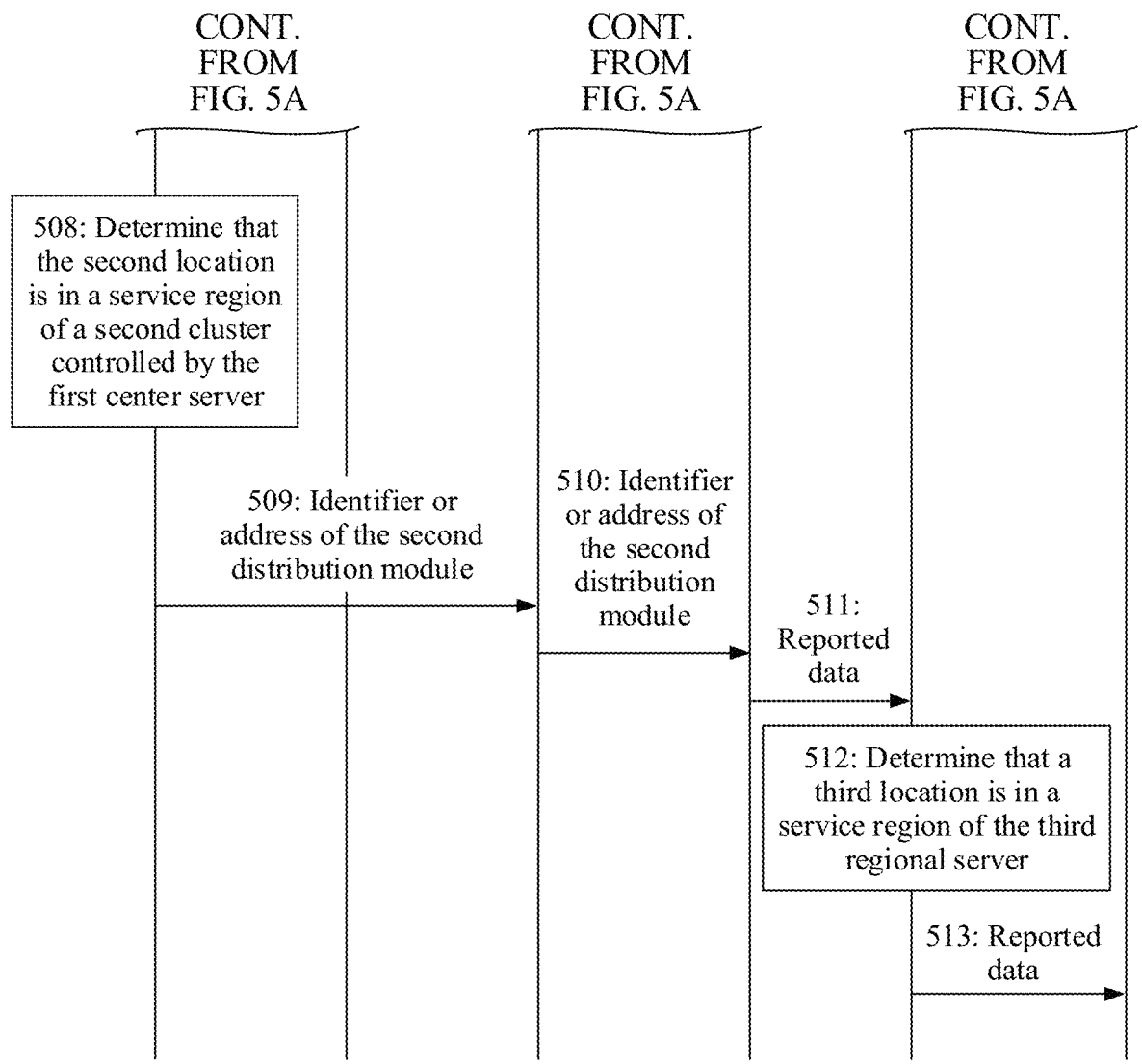

3. Refer to FIG. 5A and FIG. 5B for an embodiment in which a vehicle travels across service regions of different regional servers controlled by a same V2X-C.

501: The vehicle sends reported data to a first distribution module, where the reported data includes information about a first location of the vehicle.

502: The first distribution module determines that the first location is in a service region of a first regional server in a first cluster.

503: The first distribution module sends the reported data to the first regional server.

504: The first regional server predicts a second location at which the vehicle is to arrive, where the second location is outside the service region of the first regional server.

505: The first regional server sends information about the second location of the vehicle to the first distribution module.

Steps 501 to 505 are the same as steps 401 to 405, and details are not described herein again.

506: The first distribution module determines that the second location is outside a service region of the first cluster.

507: The first distribution module sends a message for obtaining access information of an internet of vehicles server to a first center server, where the message includes the information about the second location.

When the vehicle is driven from a service region of a cluster to a service region of another cluster, because the cluster serving the vehicle changes, and the clusters correspond to different distribution modules, the vehicle needs to obtain an identifier or an address of a distribution module corresponding to a newly arrived service region. It should be noted that, if two clusters through which the vehicle passes successively share one distribution module, in other words, one distribution module is responsible for distributing a message to regional servers of two clusters whose service regions are adjacent to each other, when the vehicle travels across the service regions of the two clusters, a communication address on a server side still does not need to be updated. In this deployment scenario, when the vehicle travels across service regions of different regional servers, the distribution module distributes the message according to the method procedure shown in FIG. 3.

508: The first center server determines that the second location is in a service region of a second cluster controlled by the first center server.

In a possible implementation, the first center server may preset a service region of each cluster controlled by the first center server, so that when receiving the second location, the first center server may be located, based on the second location, in the service region of the second cluster controlled by the first center server.

509: The first center server sends an identifier or an address of a second distribution module to the first distribution module.

In a possible implementation, the first center server may preset an identifier or an address of a distribution module corresponding to each cluster controlled by the first center server, to determine the identifier or the address of the second distribution module corresponding to the second cluster.

510: The first distribution module sends the identifier or the address of the second distribution module to the vehicle.

The first distribution module notifies, in advance based on a location at which the vehicle is to arrive and that is predicted by the first regional server, the vehicle of access information of a distribution module that needs to be accessed in a next driving road section, so that the vehicle can quickly access the distribution module corresponding to the second cluster when being driven to the service region of the second cluster. This reduces access time for the vehicle to access the second cluster after the vehicle is driven away from the first cluster, and ensures service continuity.

511: The vehicle sends reported data of the vehicle to the second distribution module, where the reported data includes information about a third location of the vehicle.

The third location is a geographical location at which the vehicle sends the reported data to the second distribution module, or a geographical location that is of the vehicle and that is obtained for the last time before the vehicle sends the reported data to the second distribution module, or a geographical location that is of the vehicle at a moment or in a time period and that is reported by the vehicle according to a preset rule.

It should be noted that the vehicle may send the reported data to the second distribution module after determining that the vehicle arrives at the service region of the second cluster, or may immediately switch an address of a communications peer end to the address of the second distribution module after receiving the message from the first distribution module. When the data needs to be reported next time, the reported data is sent to the second distribution module.

512: The second distribution module determines that the third location is in a service region of a third regional server in the second cluster.

513: The second distribution module sends the reported data to the third regional server in the second cluster.

According to the foregoing steps, a solution for ensuring service continuity of a vehicle when the vehicle travels across service regions of different clusters is provided.

Figure 6A:
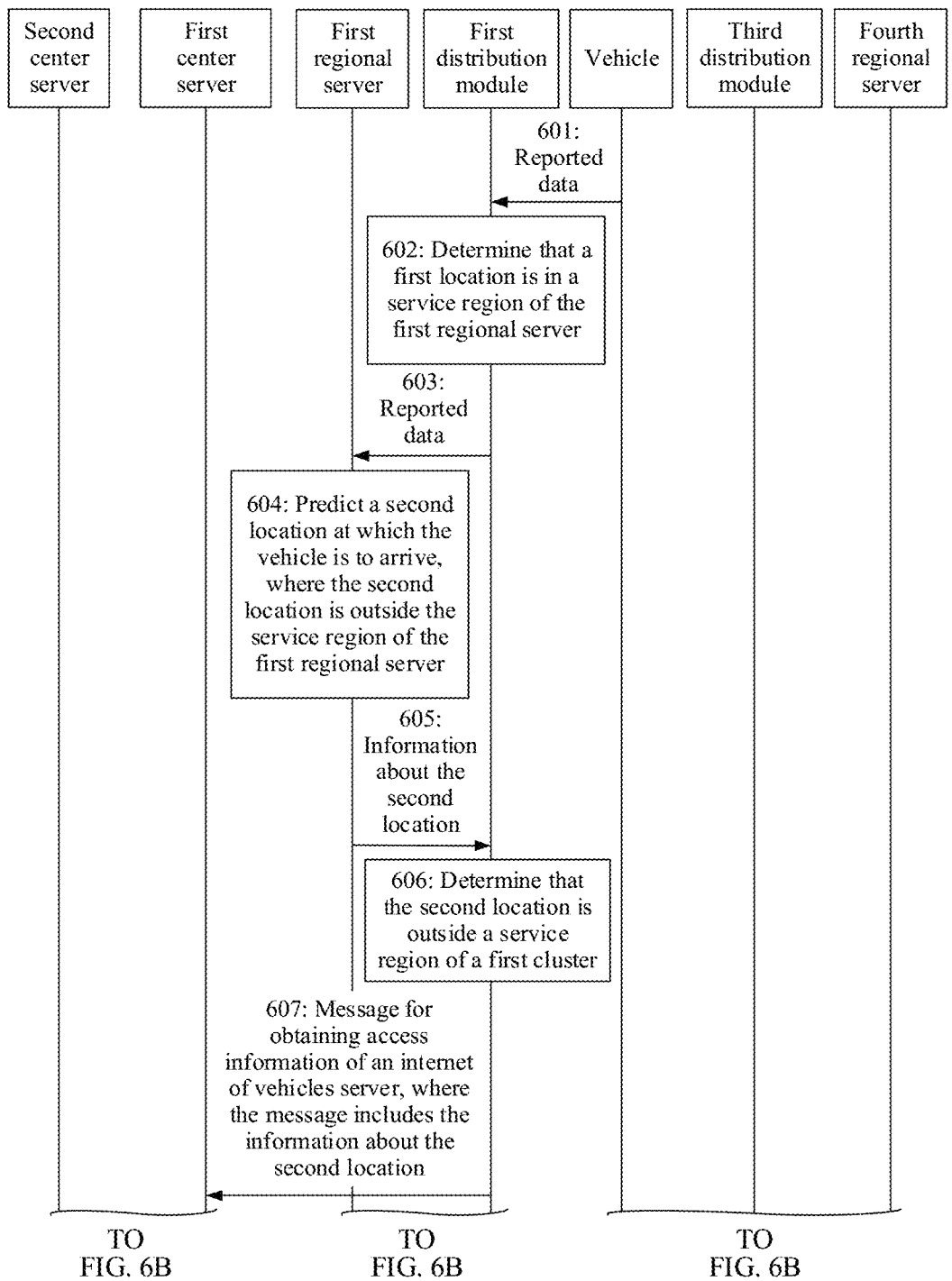
FIG. 6A and FIG. 6B are a schematic diagram of an internet of vehicles communication method when a vehicle travels across service regions of different center servers according to an embodiment of this application.
Figure 6B:
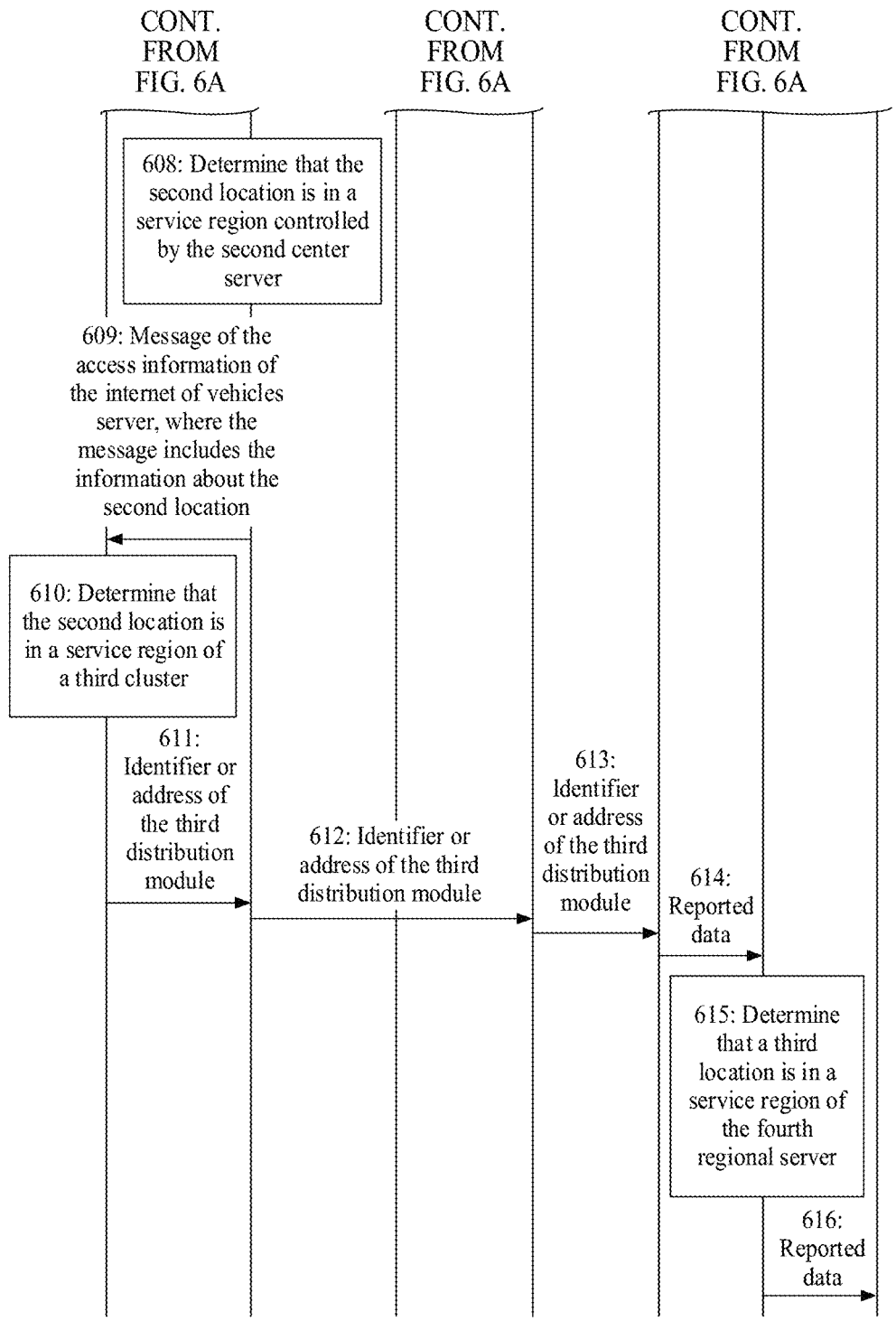

4. Referring to FIG. 6A and FIG. 6B for an embodiment in which a vehicle travels across service regions of different V2X-Cs.

601: The vehicle sends reported data to a first distribution module, where the reported data includes information about a first location of the vehicle.

602: The first distribution module determines that the first location is in a service region of a first regional server in a first cluster.

603: The first distribution module sends the reported data to the first regional server.

604: The first regional server predicts a second location at which the vehicle is to arrive, where the second location is outside the service region of the first regional server.

605: The first regional server sends information about the second location of the vehicle to the first distribution module.

606: The first distribution module determines that the second location is outside a service region of the first cluster.

607: The first distribution module sends a message for obtaining access information of an internet of vehicles server to a first center server, where the message includes the information about the second location.

Steps 601 to 607 are the same as steps 501 to 507, and details are not described herein again.

608: The first center server determines that the second location is in a service region of a second center server.

When the vehicle is driven from a service region of the first center server to the second center service region, the vehicle needs to communicate with a different distribution module. Therefore, the vehicle needs to obtain an identifier or an address of a distribution module corresponding to a newly arrived service region.

In this embodiment of this application, after receiving the information about the second location, the first center server may determine that the second location is outside the service region of the first center server. In this embodiment of this application, the first center server may preset a service region of each V2X-C. After receiving the information about the second location, the first center server may determine that the second location is in the service region of the second center server. In a possible implementation, the first center server and the second center server belong to a same V2X-C sharing alliance, and a geographical location corresponding to a service region of each V2X-C in the V2X-C sharing alliance is preset for any V2X-C in the V2X-C sharing alliance.

609: The first center server sends the message of the access information of the internet of vehicles server to the second center server, where the message includes the information about the second location.

610: The second center server determines that the second location is in a service region of a third cluster controlled by the second center server.

611: The second center server determines an identifier or an address of a third distribution module corresponding to the third cluster, and sends the identifier or the address of the third distribution module to the first center server.

612: The first center server sends the identifier or the address of the third distribution module to the first distribution module.

613: The first distribution module sends the identifier or the address of the third distribution module to the vehicle.

In a possible implementation, the first distribution module further sends a notification message to a home center server of the vehicle after step 609 or step 613, and the home center server is a subscribed center server of the vehicle. The notification message is used to notify the home center server that the vehicle is to be driven from the service region of the first center server to the service region of the second center server, so that the home center server updates information about a service region in which the vehicle is currently located.

614: The vehicle sends reported data to the third distribution module, where the reported data includes information about a third location of the vehicle.

615: The third distribution module determines that the third location is in a service region of a fourth regional server in the third cluster.

616: The third distribution module sends the reported data to the fourth regional server.

Steps 612 to 616 are similar to steps 509 to 513, and details are not described herein again.

Figure 7:
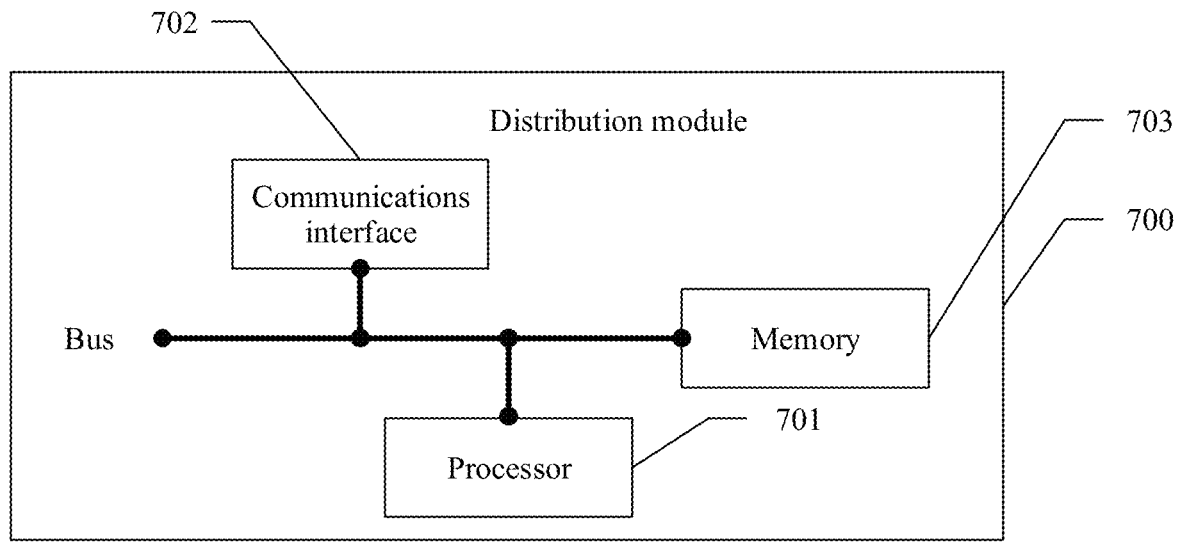
FIG. 7 is a schematic structural diagram of an apparatus of a distribution module according to an embodiment of this application.

Referring to FIG. 7, this application further provides a distribution module 700, including a bus, a processor 701, a communications interface 702, and a memory 703.

The bus is configured to connect the processor 701, the communications interface 702, and the memory 703.

The communications interface 702 is configured to communicate with an apparatus or a device outside the distribution module 700.

The memory 703 is configured to store a program.

The processor 701 is configured to execute the program stored in the memory 703. When the program is executed, the distribution module performs the method in this patent.

Figure 8:
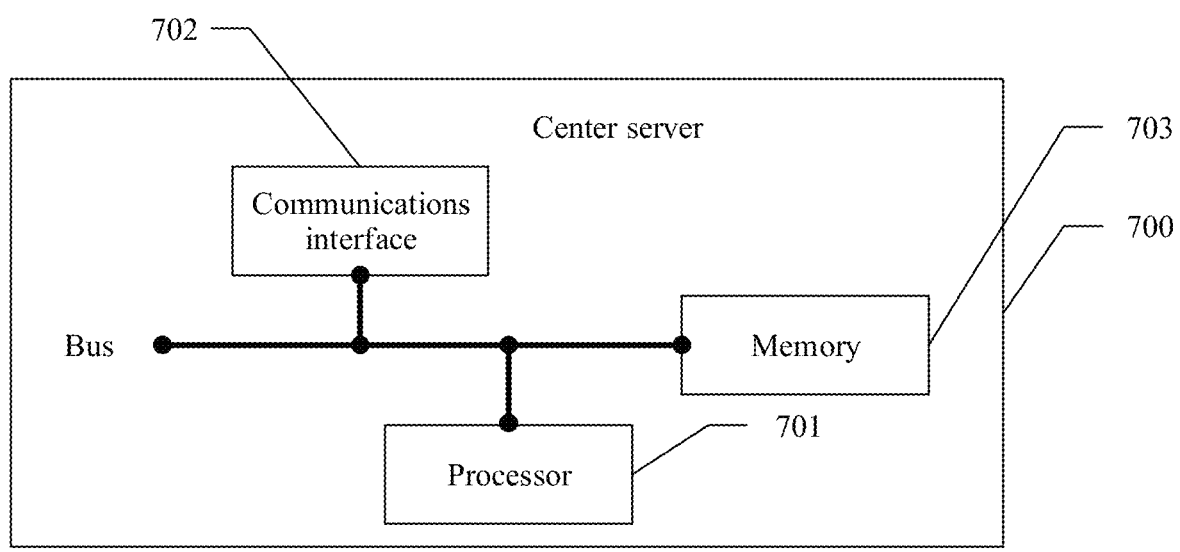
FIG. 8 is a schematic structural diagram of an apparatus of a center server according to an embodiment of this application.

Referring to FIG. 8, this application further provides a center server 800, including a bus, a processor 801, a communications interface 802, and a memory 803.

The bus is configured to connect the processor 801, the communications interface 802, and the memory 803.

The communications interface 802 is configured to communicate with an apparatus or a device outside the center server 800.

The memory 803 is configured to store a program.

The processor 801 is configured to execute the program stored in the memory 803. When the program is executed, the center server 800 performs the method in this patent.

Figure 9:
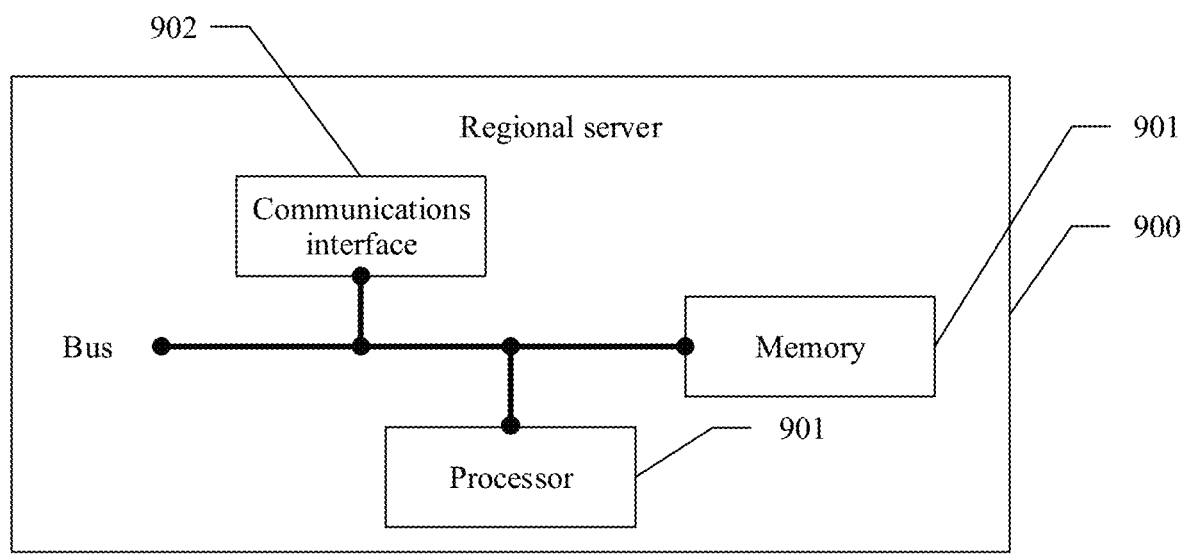
FIG. 9 is a schematic structural diagram of an apparatus of a regional server according to an embodiment of this application.

Referring to FIG. 9, this application further provides a regional server 900, including a bus, a processor 901, a communications interface 902, and a memory 903.

The bus is configured to connect the processor 901, the communications interface 902, and the memory 903.

The communications interface 902 is configured to communicate with an apparatus or a device outside the regional server.

The memory 903 is configured to store a program.

The processor 901 is configured to execute the program stored in the memory 903. When the program is executed, the regional server 900 performs the method in this patent.

The bus may include a channel, used to transmit information between the foregoing components.

The processor 701/801/901 may be a general-purpose central processing unit (CPU), a microprocessor, an application-specific integrated circuit (ASIC), or one or more integrated circuits used to control program execution of the solutions in the present disclosure.

The communications interface 702/802/902 uses any transceiver-type apparatus, to communicate with another device or a communications network such as the Ethernet, a radio access network (RAN), or a wireless local area network (WLAN).

The memory 703/803/903 may be a read-only memory (ROM), another type of static storage device that can store static information and instructions, a random-access memory (RAM), or another type of dynamic storage device that can store information and instructions, or may be an electrically erasable programmable ROM (EEPROM), a compact disc (CD) ROM (CD-ROM) or another CD storage, an optical disc storage (including a CD, a laser disc, an optical disc, a digital versatile disc (DVD), a BLU-RAY disc, and the like), a magnetic disk storage medium, another magnetic storage device, or any other medium that can be configured to carry or store expected program code in a form of an instruction or a data structure and that can be accessed by a computer. However, the memory 703/803/903 is not limited thereto. The memory may exist independently, and is connected to the processor through the bus. The memory may alternatively be integrated with the processor.

All or some of the foregoing embodiments may be implemented by using software, hardware, firmware, or any combination thereof. When software is used to implement the embodiments, the embodiments may be implemented all or partially in a form of a computer program product.

The computer program product includes one or more computer instructions. When the computer program instructions are loaded and executed on the computer, the procedure or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in another manner. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one place, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the other approaches, or all or some of the technical solutions may be implemented in the form of a software product. The computer software product is stored in a storage medium and includes several instructions for instructing a computer device (which may be a personal computer, a server, or a network device) to perform all or some of the steps of the methods described in the embodiments of this application. The foregoing storage medium includes any medium that can store program code, such as a Universal Serial Bus (USB) flash drive, a removable hard disk, a ROM, a RAM, a magnetic disk, or an optical disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and region of the technical solutions of the embodiments of this application.

What is claimed is:

1. A method implemented by a first distribution device, wherein the method comprises:
receiving reported data of a vehicle, wherein the reported data comprises first information about a first location of the vehicle, a driving speed of the vehicle, and a driving track of the vehicle, wherein the first location is in a second regional server in a first cluster;
identifying the second regional server based on the first information;
sending the reported data to the second regional server;
sending the reported data to a first regional server in the first cluster to instruct the first regional server to predict, according to the first information about the first location of the vehicle, second information about a second location of the vehicle, wherein the first cluster comprises the first distribution device and the first regional server;
receiving, from the first regional server, the second information about the second location of the vehicle based on the first location and at which the vehicle is to arrive;
identifying that the second location is in a first service region of a third regional server of a second cluster;
obtaining, based on the second location, an identifier or an address of a second distribution device that distributes vehicle data to the third regional server in the second cluster, wherein the second cluster comprises the second distribution device and the third regional server; and
sending the identifier or the address to the vehicle to communicate with the second distribution device.

2. The method of claim 1, further comprising identifying the first regional server based on the first location.

3. The method of claim 1, further comprising:
sending, to a first center server, a message requesting access information of an internet of vehicles server, wherein the message comprises the second information; and
receiving the identifier or the address from the first center server.

4. The method of claim 1, further comprising:
sending, to a first center server, a message requesting access information of an internet of vehicles server, wherein the message comprises the second information; and
receiving, from the first center server, the identifier or the address originating from a second center server based on the second location.

5. The method of claim 4, wherein after receiving the identifier or the address, the method further comprises sending, to a home center server of the vehicle, a notification message notifying the home center server that the vehicle prepares to travel from a second service region of the first center server to a third service region of the second center server, and wherein the home center server is a subscribed center server of the vehicle.

6. The method of claim 1, further comprising communicating with the vehicle based on a second identifier or a second address of the first distribution device.

7. The method of claim 1, wherein the method is implemented in an Internet of vehicles communication system.

8. The method of claim 1, wherein the method is implemented in vehicle to everything (V2X) communication system.

9. A first distribution device comprising:
a memory configured to store instructions; and
a processor coupled to the memory and configured to execute the instructions to cause the first distribution device to be configured to:
receive reported data of a vehicle comprising first information about a first location of the vehicle, a driving speed of the vehicle, and a driving track of the vehicle, wherein the first location is in a second regional server in a first cluster;
identify the second regional server based on the first information;
send the reported data to the second regional server;
send the reported data to a first regional server in the first cluster to instruct the first regional server to predict, according to the first information about the first location of the vehicle, second information about a second location of the vehicle, wherein the first cluster comprises the first distribution device and the first regional server;
receive, from the first regional server, the second information about the second location of the vehicle based on the first location and at which the vehicle is to arrive;
identify that the second location is in a first service region of a third regional server of a second cluster;
obtain, based on the second location, an identifier or an address of a second distribution device that distributes vehicle data to the third regional server in the second cluster, wherein the second cluster comprises the second distribution device and the third regional server; and
send the identifier or the address to the vehicle to communicate with the second distribution device.

10. The first distribution device of claim 9, wherein the processor is further configured to execute the instructions to cause the first distribution device to be configured to identify the first regional server based on the first location.

11. The first distribution device of claim 10, wherein the processor is further configured to execute the instructions to cause the first distribution device to be configured to:
send, to a first center server, a message requesting access information of an internet of vehicles server, wherein the message comprises the second information, and wherein the first center server is configured to control the first cluster and the second cluster; and
receive, from the first center server, the identifier or the address.

12. The first distribution device of claim 9, wherein the processor is further configured to execute the instructions to cause the first distribution device to be configured to:
send, to a first center server, a message requesting access information of an internet of vehicles server, wherein the message comprises the second information, and wherein the first center server is configured to control the first cluster and the second cluster; and
receive, from the first center server, the identifier or the address.

13. The first distribution device of claim 9, wherein the processor is further configured to execute the instructions to cause the first distribution device to be configured to:
send, to a first center server, a message requesting access information of an internet of vehicles server, wherein the message comprises the second information, and wherein the first center server is configured to control the first cluster and to communicate with a second center server that controls the second cluster; and receive, from the first center server, the identifier or the address that is obtained by the first center server from the second center server based on the second location.

14. A computer program product comprising instructions stored on a non-transitory computer-readable medium that, when execute by a processor, cause a first distribution device to:
receive reported data of a vehicle, wherein the reported data comprises first information about a first location of the vehicle, a driving speed of the vehicle, and a driving track of the vehicle, wherein the first location is in a second regional server in a first cluster;
identify the second regional server based on the first information;
send the reported data to the second regional server;
send the reported data to a first regional server in the first cluster to instruct the first regional server to predict, according to the first information about the first location of the vehicle, second information about a second location of the vehicle, wherein the first cluster comprises the first distribution device and the first regional server;
receive, from the first regional server, the second information about the second location of the vehicle based on the first location and at which the vehicle is to arrive;
identify that the second location is in a first service region of a third regional server of a second cluster;
obtain, based on the second location, an identifier or an address of a second distribution device that distributes vehicle data to the third regional server in the second cluster, wherein the second cluster comprises the second distribution device and the third regional server; and
send the identifier or the address to the vehicle to communicate with the second distribution device.

15. The computer program product of claim 14, wherein the processor is further configured to execute the instructions to cause the first distribution device to identify the first regional server based on the first location.

16. The computer program product of claim 14, wherein the processor is further configured to execute the instructions to cause the first distribution device to:
send, to a first center server, a message requesting access information of an internet of vehicles server, wherein the message comprises the second information; and
receive the identifier or the address from the first center server.

17. The computer program product of claim 14, wherein the processor is further configured to execute the instructions to cause the first distribution device to:
send, to a first center server, a message requesting access information of an internet of vehicles server, wherein the message comprises the second information; and
receive, from the first center server, the identifier or the address originating from a second center server based on the second location.

18. The computer program product of claim 17, wherein after receiving the identifier or the address, the processor is further configured to execute the instructions to cause the first distribution device to send, to a home center server of the vehicle, a notification message notifying the home center server that the vehicle prepares to travel from a second service region of the first center server to a third service region of the second center server, and wherein the home center server is a subscribed center server of the vehicle.

* * * * *

UNITED STATES PATENT AND TRADEMARK OFFICE
CERTIFICATE OF CORRECTION

PATENT NO.         : 12,279,106 B2
APPLICATION NO.    : 17/334087
DATED              : April 15, 2025
INVENTOR(S)        : Kai Zhou and Yan Liu Page 1 of 1

It is certified that error appears in the above-identified patent and that said Letters Patent is hereby corrected as shown below:

On the Title Page

Page 2, (56) References Cited, U.S. Patent Documents add: "20180049274 A1 2/2015 Kim et al."

Signed and Sealed this
Twentieth Day of May, 2025

Coke Morgan Stewart
*Acting Director of the United States Patent and Trademark Office*